United States Patent Office 3,517,207
Patented June 23, 1970

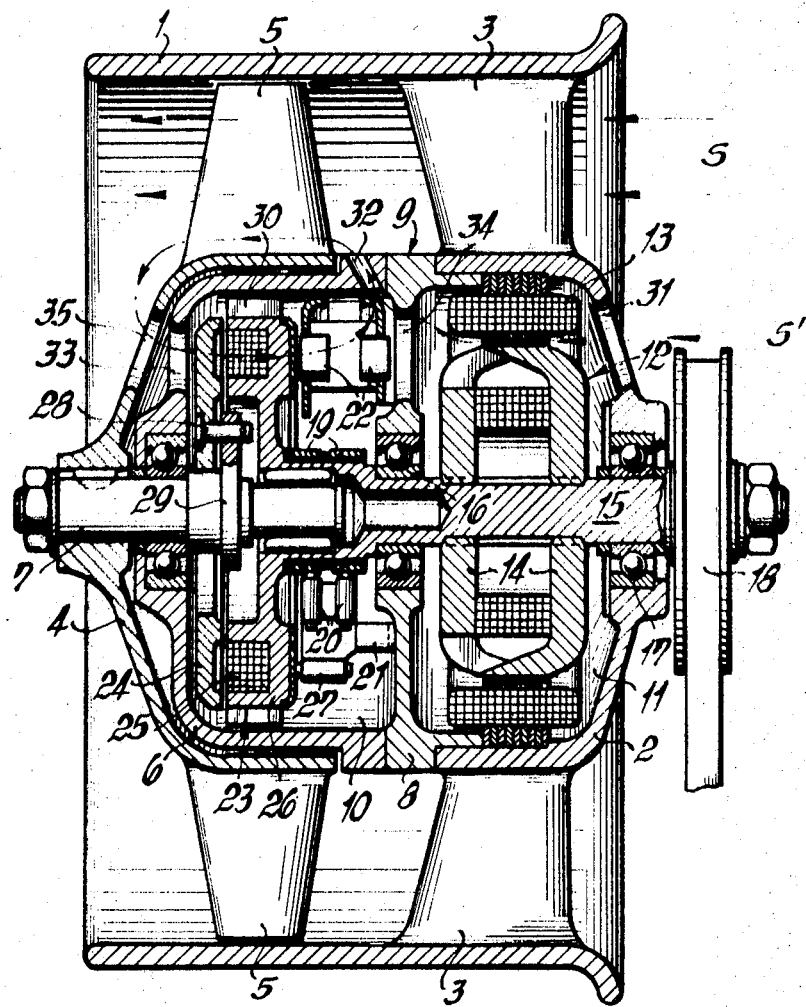

3,517,207
AXIAL COOLING AIR BLOWER FOR INTERNAL COMBUSTION ENGINES
Ferdinand Piëch, Stuttgart-Nord, and Rolf Schrag, Stuttgart - Unterturkheim, Germany, assignors to Firma Porsche KG, Stuttgart-Zuffenhausen, Germany
Filed Oct. 16, 1967, Ser. No. 675,701
Claims priority, application Germany, Nov. 18, 1966, 1,291,162
Int. Cl. H02k 9/06
U.S. Cl. 290—1                                    13 Claims

ABSTRACT OF THE DISCLOSURE

An axial cooling air blower for internal combustion engines, the blower rotor of which is driven by the shaft of an alternating current generator provided within the blower hub. The generator is constantly driven by the internal combustion engine and an electromagnetically actuated friction clutch is drivingly interposed between the generator and blower rotor. The clutch is provided within the hub and has one clutch member integral with the generator shaft and provided with blades for circulating air through suitable openings within the hub. The hub is internally divided into two chambers by a partition having a bearing supporting the generator shaft, so that the generator is in one chamber and the clutch is within the other chamber. Diodes for rectifying the current and the slip ring and brushes for the generator are within the chamber having the clutch.

BACKGROUND OF THE INVENTION

DC dynamos have been arranged within the hub of a cooling blower for internal combustion engines. Cooling air has been provided for the dynamos by means of a portion of the air circulated by the blower rotor. The dynamo housing is usually provided with corresponding openings for this purpose. A disadvantage resides in the fact that the space available within the blower hub is entirely consumed by structural components, so that there is no room for elements to vary the amount of cooling air delivered by the blower rotor. The utilization of an alternator in place of a DC generator affords more room within the hub where other components can be incorporated. However, the provision of an alternator within the hub has the disadvantage that the heat accumulation is substantially larger than would be obtained with a DC generator. Such a disadvantage would normally be compounded by the provision of thermostatically controlled clutches, because they would likewise cause a relatively large heat accumulation.

SUMMARY OF THE INVENTION

It is an object of the present invention to overcome the above-mentioned disadvantages while providing a variable capacity cooling air blower and generator that is extremely simple and compact.

The present invention provides an axial cooling air blower having a hub containing therein an alternator and accommodating means for varying the amount of air circulated by the blower according to the operating conditions of the engine to lower the total energy requirements of the cooling air blower.

This is specifically accomplished by driving the blower rotor through an electromagnetically actuated friction clutch arranged coaxial to the generator within the blower hub. One member of the clutch continuously rotates and carries vanes to circulate air through suitable openings within the hub. An electromagnetic clutch has the advantages of small dimensions and simple operation, and the further advantage that the constantly rotating member can be easily provided with a vane wheel. Thus, the hub ventilating system is substantially independent of the blower rotor to solve the problems of heat accumulation caused by the generator and clutch. The electromagnetic clutch may be switched on or off depending upon one or several operating conditions of the engine, for example by means of thermostats. In addition or in the alternative, the electromagnetic clutch may be controlled manually by the driver with reference to an oil temperature indicator.

Heat radiation from the electromagnetic clutch to the generator is avoided by subdividing the hub of the cooling air blower by a vertical partition to form one chamber receiving the generator and a second chamber receiving the electromagnetic friction clutch. Also, the partition may be provided with a bearing for the generator shaft and recesses for ventilation. The slip ring and brush elements along with rectifying means for the generator output may advantageously be accommodated within the chamber having therein the clutch, so that the operating conditions of the generator are additionally improved. The structure is further advantageously simplified if the rectifying elements, that is the diodes, are mounted on the partition so that these individual components can be prefabricated together with a partition.

BRIEF DESCRIPTION OF THE DRAWING

The single figure in the drawing shows an axial cross sectional view of an axial cooling air blower for an air-cooled internal combustion engine of an automobile.

DETAILED DESCRIPTION OF THE DRAWING

The axial cooling air blower of the present invention is constructed as a complete unit, which is then attached to the internal combustion engine (not shown in detail). The blower includes a cylindrical housing 1 that is integrally constructed as one piece with a front or inlet side portion 2 of the hub. The hub portion 2 is integrally connected with the housing 1 by the radially extending guide vane supports 3 distributed along the adjacent circumferences. The supports 3 are utilized for guiding the air flowing in the direction of the arrows S.

The air is driven through the housing 1 by means of a rotatable blower rotor 4 having a plurality of radially extending blower vanes 5. The blower rotor 4 surrounds a rear or outlet side portion 6 of the hub and is keyed or otherwise rotatably secured to the blower drive shaft 7. The rear portion 6 of the hub is mounted to the front portion 2 by means of an intermediate portion formed by the partition 8. The partition 8 subdivides the entire hub 9 of the cooling air blower into chambers 10 and 11.

A conventional 3-phase generator 12 is suitably mounted within the chamber 11 and has a stator winding 13 and a forked or claw-pole armature 14. The armature 14 is rigidly secured for rotation with the armature shaft 15 that rotates within a bearing 16 in the partition 8 and a further bearing 17 in the front portion 2 of the hub. The shaft 15 is constantly driven by the crank shaft of the internal combustion engine by means of the belt drive 18, which is partially indicated in the drawing. The armature shaft 15 passes through the partition 8 into the chamber 10 where it is provided with a slip ring 19 and brushes 20 engaging the slip ring 19 for accommodating the energizing voltage of the generator. The brushes 20 are mounted on the partition 8 by means of a suitable support 21. Likewise, diodes 22 are mounted on the partition 8 by suitable angular brackets or the like to rectify the generator output.

An electromagnetic friction clutch 23 is suitably mounted within the chamber 10. The clutch includes an armature disk 24 and a coil carrier 26 containing the electromagnet 25. The coil carrier 26 is constructed as an integral one-piece part of the generator shaft 15 so that it continuously rotates with the internal combustion engine. The coil carrier 26 is provided on one side with a slip ring engaging a carbon brush 27 for energizing the electromagnet. The armature disk 24 is mounted in an axially displaceable manner by means of pins 28 circumferentially distributed on a flange 29 of the blower drive shaft 7, so that the disk 24 also serves as the movable friction member of the clutch.

The generator 12 and clutch 23 are cooled by ventilation of the chambers 10 and 11 by an impeller ring having a plurality of vanes 30 on the outer circumference of the coil carrier 26. The vanes 30 drive the air to produce a secondary current S' as illustrated in dot and dash lines in the drawing. For this secondary air stream S', the hub portions 2 and 6 are provided with ventilation openings 31, 32 and 33, and the partition 8 is provided with a ventilating opening 34. Also, the secondary air stream is conducted through the blower rotor 4 by means of openings 35 provided on the exit side thereof.

When operating the generator, the generator shaft 15 is constantly rotated by means of the belt drive 18 so that the generator 12 supplies current to the battery and electrical system of the automobile. The hub 9 is ventilated through the openings 31, 33 and 34 because of the constantly produced air stream S'.

When the engine is cold, the blower rotor 4 first remains inactive as determined by suitable manual or automatic controls associated with the clutch until the lubricating oil or the working cylinders have attained a temperature requiring the circulation of cooling air. When this temperature is attained, the circuit to the electromagnet 25 is closed to energize the same by means of the thermostat, or the like control. When the electromagnet 25 is energized, the magnetic field will attract the armature disk 24 to obtain a driving friction connection with the coil carrier 26 and establish a driving connection between the generator shaft 15 and the blower drive shaft 7 to start circulation of cooling air to the engine cylinders.

A specific preferred embodiment of the present invention has been shown and described in detail for purposes of illustration; however, the further modifications, variations and embodiments are contemplated within the spirit and scope of the following claims.

We claim:

1. An axial cooling air blower for internal combustion engines, comprising: a housing; a hub portion within said housing; a blower rotor rotatably mounted within said housing and having blower means between said hub portion and said housing; an alternating current generator mounted within said hub portion and having a rotatable armature shaft; drive means for constantly driving said armature shaft from the internal combustion engine; electromagnetically actuated friction clutch means for drivingly connecting said armature shaft with said blower rotor and being mounted within said hub portion, wherein said hub portion has a plurality of ventilating openings; said clutch means has one clutch member rigidly attached to said armature shaft, and said one clutch member has a plurality of radially extending blower vanes for circulating air through said hub portion openings.

2. The device of claim 1, wherein said one clutch member and said armature shaft are integrally constructed as one piece; said blower rotor has a shaft provided with a portion telescopically mounted with respect to said armature shaft and bearing means therebetween.

3. The device of claim 1, including partition wall means subdividing said hub portion into two axially spaced chambers; said generator being mounted within one of said chambers and said clutch means being mounted within the other of said chambers; said partition wall means having bearing means for rotatably supporting said armature shaft and having a ventilating opening providing circulating communication between said chambers.

4. The device of claim 3, including slip ring and brush means for energizing said generator being mounted within said other chamber; rectifier means for converting the alternating current output of said generator into a direct current being mounted within said other chamber.

5. The device of claim 4, wherein said rectifying means consists of a plurality of diodes in circuit being mounted on said partition wall means.

6. The device of claim 5, wherein said housing is substantially tubular and substantially coaxial with said blower rotor and armature shaft; said hub portion is substantially concentric with said housing forms therebetween an annular chamber extending substantially the entire axial length of said housing, said housing has a diameter larger than its axial length.

7. The device of claim 6, wherein said blower rotor vanes are within said annular chamber; said hub portion consisting of a first inlet side portion integrally constructed as one piece with said housing, a second intermediate portion integral with said partition wall means and a third outlet side portion; said first portion having bearing means rotatably supporting said armature shaft; said third portion having bearing means rotatably supporting said blower rotor.

8. The device of claim 7, including a plurality of stationary radial guide vanes integral with and extending between said housing and said hub portion first section within said annular chamber.

9. The device of claim 8, wherein said one clutch member and said armature shaft are integrally constructed as one piece; said blower rotor has a shaft provided with a portion telescopically mounted with respect to said armature shaft and bearing means therebetween.

10. An axial cooling air blower for internal combustion engines, comprising: a housing; a knob portion within said housing; a blower rotor rotatably mounted within said housing and having blower vanes between said hub portion and said housing; an alternating current generator mounted within said hub portion and having a rotatable armature shaft; drive means for constantly driving said armature shaft from the internal combustion engine; electromagnetically actuated friction clutch means for drivingly connecting said armature shaft with said blower rotor and being mounted within said hub portion, including partition wall means subdividing said hub portion into two axially spaced chambers; said generator being mounted within one of said chambers and said clutch means being mounted within the other of said chambers; said partition wall means having bearing means for rotatably supporting said armature shaft and having a ventilating opening providing circulating communication between said chambers.

11. An axial cooling air blower for internal combustion engines, comprising: a housing; a hub portion within said housing; said hub portion being subdivided into two axially spaced chambers; a blower rotor rotatably mounted within said housing and having blower vanes between said hub portion and said housing; an alternating current generator mounted within one of said chambers and having a rotatable armature shaft; drive means for constantly driving said armature shaft from the internal combustion engine; electromagnetically actuated friction clutch means for drivingly connecting said armature shaft with said blower rotor and being mounted within the other of said chambers; slip ring and brush means for energizing said generator being mounted within said other chamber; and rectifier means for converting the alternating current output of said generator into a direct current being mounted within said other chamber.

12. The device of claim 11, wherein said housing is substantially tubular and substantially coaxial with said blower rotor and armature shaft; said hub portion is substantially concentric with said housing forming therebetween an annular chamber extending substantially the entire axial length of said housing, said housing has a diameter larger than its axial length.

13. The device of claim 12, wherein said blower rotor vanes are within said annular chamber; said hub portion consisting of a first inlet side portion integrally constructed as one piece with said housing, a second intermediate portion integral with said partition wall means and a third outlet side portion; said first portion having bearing means rotatably supporting said armature shaft; said third portion having bearing means rotatably supporting said blower rotor.

References Cited

FOREIGN PATENTS 1,882,763  3/1962  Germany.
705,765    3/1954  Great Britain.

ORIS L. RADER, Primary Examiner

W. E. DUNCANSON, JR., Assistant Examiner